United States Patent
Sasaki (10) Patent No.: US 7,184,390 B2
(45) Date of Patent: *Feb. 27, 2007

(54) DATA MANAGEMENT INFORMATION OBTAINING METHOD FOR OBTAINING DATA MANAGEMENT INFORMATION INCLUDING INFORMATION CONCERNING PART OF DATA AREAS AS INFORMATION CONCERNING A PSEUDO AREA

(75) Inventor: Yoshiyuki Sasaki, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/234,299

(22) Filed: Sep. 26, 2005

(65) Prior Publication Data
US 2006/0018228 A1   Jan. 26, 2006

Related U.S. Application Data

(63) Continuation of application No. 10/320,489, filed on Dec. 17, 2002, now Pat. No. 7,050,384.

(30) Foreign Application Priority Data

Dec. 19, 2001  (JP)  ............................. 2001-385652
Dec. 26, 2001  (JP)  ............................. 2001-393643

(51) Int. Cl.
*G11B 7/24*   (2006.01)

(52) U.S. Cl. ............... 369/275.3; 369/53.2; 369/53.31; 369/30.05; 711/113

(58) Field of Classification Search ............ 369/30.04, 369/30.05, 124.03, 53.21, 53.31, 275.3, 47.28, 369/47.3, 53.1, 53.2, 59.1, 84; 711/112–113, 711/119, 133; 386/126, 95–96, 111
See application file for complete search history.

(56) References Cited

U.S. PATENT DOCUMENTS 5,132,853 A    7/1992   Kulakowski et al.

(Continued)

FOREIGN PATENT DOCUMENTS

JP         08-161751        6/1996

(Continued)

*Primary Examiner*—Ali Neyzari
(74) *Attorney, Agent, or Firm*—Dickstein Shapiro LLP (57) ABSTRACT

On an information recording medium, a recording area is divided in a plurality of data areas, and data is recorded on each of the data areas. In response to a request for obtaining data management information concerning a recording of the data recorded on each of the data areas, a plurality of predetermined data areas among the foregoing data areas are regarded as a predetermined pseudo area, and the data management information including information concerning the predetermined pseudo area is obtained.

3 Claims, 6 Drawing Sheets

U.S. PATENT DOCUMENTS

| | | |
|---|---|---|
| 5,351,132 A | 9/1994 | Sawabe et al. |
| 5,351,226 A | 9/1994 | Mizumoto et al. |
| 5,568,628 A | 10/1996 | Satoh et al. |
| 5,825,726 A | 10/1998 | Hwang et al. |
| 6,009,498 A | 12/1999 | Kumasawa et al. |
| 6,243,340 B1 | 6/2001 | Ito et al. |
| 6,272,081 B1 | 8/2001 | Murata |
| 6,363,040 B1 | 3/2002 | Murata |
| 6,594,743 B1 | 7/2003 | Chen et al. |
| 6,621,783 B1 | 9/2003 | Murata |
| 6,728,186 B2 | 4/2004 | Weijenbergh et al. |
| 7,050,384 B2 * | 5/2006 | Sasaki ............... 369/275.3 |
| 2002/0024902 A1 | 2/2002 | Sasaki |
| 2002/0101791 A1 | 8/2002 | Ito |
| 2002/0114245 A1 | 8/2002 | Sasaki |
| 2002/0159353 A1 | 10/2002 | Sasaki |
| 2003/0033475 A1 | 2/2003 | Sasaki |
| 2004/0218480 A1 | 11/2004 | Ichikawa et al. |

FOREIGN PATENT DOCUMENTS

| | | |
|---|---|---|
| JP | 09-312086 | 12/1997 |
| JP | 10-134518 | 5/1998 |
| JP | 10-228754 | 8/1998 |
| JP | 10-326474 | 12/1998 |
| JP | 2000048378 A | 2/2000 |
| JP | 2002-117649 | 4/2002 |
| KR | 183160 | 5/1999 |

* cited by examiner

DATA MANAGEMENT INFORMATION OBTAINING METHOD FOR OBTAINING DATA MANAGEMENT INFORMATION INCLUDING INFORMATION CONCERNING PART OF DATA AREAS AS INFORMATION CONCERNING A PSEUDO AREA

CROSS-REFERENCE TO RELATED APPLICATION

This application is a continuation of U.S. patent application Ser. No. 10/320,489, filed Dec. 17, 2002 now U.S. Pat. No. 7,050,384, the subject matter of which is incorporated in its entirety by reference herein.

BACKGROUND OF THE INVENTION

1. Field of the Invention

The present invention generally relates to a data management information obtaining method, an information reproducing device, a data management information obtaining program, and a recording medium, and more particularly, to a data management information obtaining method for obtaining management information concerning a recording of data recorded on each of data areas divided in a recording area of an information recording medium, an information reproducing device using the data management information obtaining method, a data management information obtaining program for causing a control computer of the information reproducing device to perform the data management information obtaining method, and a recording medium storing the data management information obtaining program.

2. Description of the Related Art

Recently, personal computers have been provided with improved functions, such as a function of dealing with AV (Audio-Visual) information concerning music and video images. Since the AV information amounts to a considerably large extent, optical discs, such as a CD-R and a DVD+R, have come to attract attention as information recording media for recording such AV information. Further, as such optical discs have become inexpensive, optical disc devices as information reproducing devices have become widespread as peripheral devices for a personal computer.

Recordable optical discs, such as a CD-R and a DVD+R, adopt a file system conforming to a sequential UDF (Universal Disc Format) standard. In a recording area of such an optical disc, data is recorded sequentially in recording units referred to as tracks (or fragments for DVD+R). Further, a lead-in and a lead-out are added to an area composed of the tracks so as to form a session. Besides, hereinbelow, the term "track" is sometimes used for representing not only a track but also a fragment, for convenience' sake.

For example, a recording area of a DVD+R accommodates a maximum of 191 sessions, and each of the sessions is capable of storing a maximum of 16 fragments. That is, a DVD+R can include a maximum of 3056 (191×16) fragments. Besides, in a DVD+R, a lead-in of a second session and after is referred to as an Intro, and a lead-out of a second last session and before is referred to as a Closure. Additionally, an area referred to as a session disc control block (SDCB) provided in a lead-in (or an Intro) of each session stores information concerning individual fragments of the session (hereinafter referred to as "fragment information" which includes a fragment number, and a start address and a final address of the fragment). Further, the SDCB includes not only the fragment information concerning all of the fragments in the session, but also information concerning each of sessions preceding the present session which includes session numbers, a start address and a final address of each session.

In addition, a host device (e.g., a personal computer) needs information concerning a recording of data recorded on an optical disc prior to reproducing the data from the optical disc. Therefor, the host device requests an optical disc device to provide data management information including information concerning sessions existing in the optical disc (hereinafter referred to as "session information" which includes the number of sessions included in a recording area) and information concerning tracks (hereinafter referred to as "track information" which includes the number of tracks included in the recording area and track addresses indicating recording positions of the tracks).

Then, for example when the optical disc is DVD+R, the optical disc device informs the host device of the above-mentioned fragment information in response to the request from the host device for the track information. Otherwise, when the optical disc is CD-R, the optical disc device obtains a response to the request from the host device for the track information, based on track information recorded in an area referred to as a program memory area (PMA).

However, for example when the optical disc is DVD+R, since the fragment information is recorded in the SDCB of each session, the conventional optical disc device has to sequentially search the SDCBs of the sessions distributed in the recording area upon receiving the request from the host device for the track information. Thus, the conventional optical disc device has an inconvenience of considerably deteriorated performance, i.e., a considerably decreased response speed with respect to the request from the host device for the track information.

Thereupon, it is conceivable that the conventional optical disc device may obtain beforehand all the fragment information upon insertion of the optical disc thereinto. However, as mentioned above, the conventional optical disc device requires a considerably long time to obtain all the fragment information; thus, there is an inconvenience of an increased disc mount time, which forces a user to wait for a long time to access the optical disc after inserting the optical disc into the optical disc device. Further, as mentioned above, since the DVD+R can include 3056 fragments at the maximum, it is difficult to store the fragment information of all of these fragments, in consideration of memory capacity.

SUMMARY OF THE INVENTION

It is a general object of the present invention to provide an improved and useful data management information obtaining method, an information reproducing device, a data management information obtaining program and a recording medium in which the above-mentioned problems are eliminated.

A more specific object of the present invention is to provide a data management information obtaining method for quickly obtaining information concerning a recording of data recorded on an information recording medium in response to a request for obtaining the information, an information reproducing device using the data management information obtaining method, a data management information obtaining program executed by a control computer of the information reproducing device to perform the data management information obtaining method, and a recording medium storing the data management information obtaining program.

In order to achieve the above-mentioned objects, there is provided according to one aspect of the present invention a data management information obtaining method for obtaining data management information concerning a recording of data recorded on each of data areas divided in a recording area of an information recording medium as a response to a request for obtaining the data management information, the method including the step of obtaining the data management information including information concerning a plurality of predetermined data areas among the foregoing data areas as information concerning a predetermined pseudo area in response to the request for obtaining the data management information.

According to the present invention, the information concerning a plurality of the predetermined data areas among the data areas are regarded as the information concerning the predetermined pseudo area, to the extent that the requested data management information is not adversely influenced; accordingly, unnecessary information does not have to be obtained in response to the request for obtaining the data management information. Therefore, the data management information can be obtained in a shortened time. Consequently, in response to the request for obtaining the information concerning the recording of the data recorded on the information recording medium, the requested information can be quickly obtained.

Other objects, features and advantages of the present invention will become more apparent from the following detailed description when read in conjunction with the accompanying drawings.

DETAILED DESCRIPTION OF THE PREFERRED EMBODIMENTS

<<Embodiment 1>>

A description will now be given, with reference to FIG. 1 and FIG. 2, of a first embodiment according to the present invention.

Figure 1:
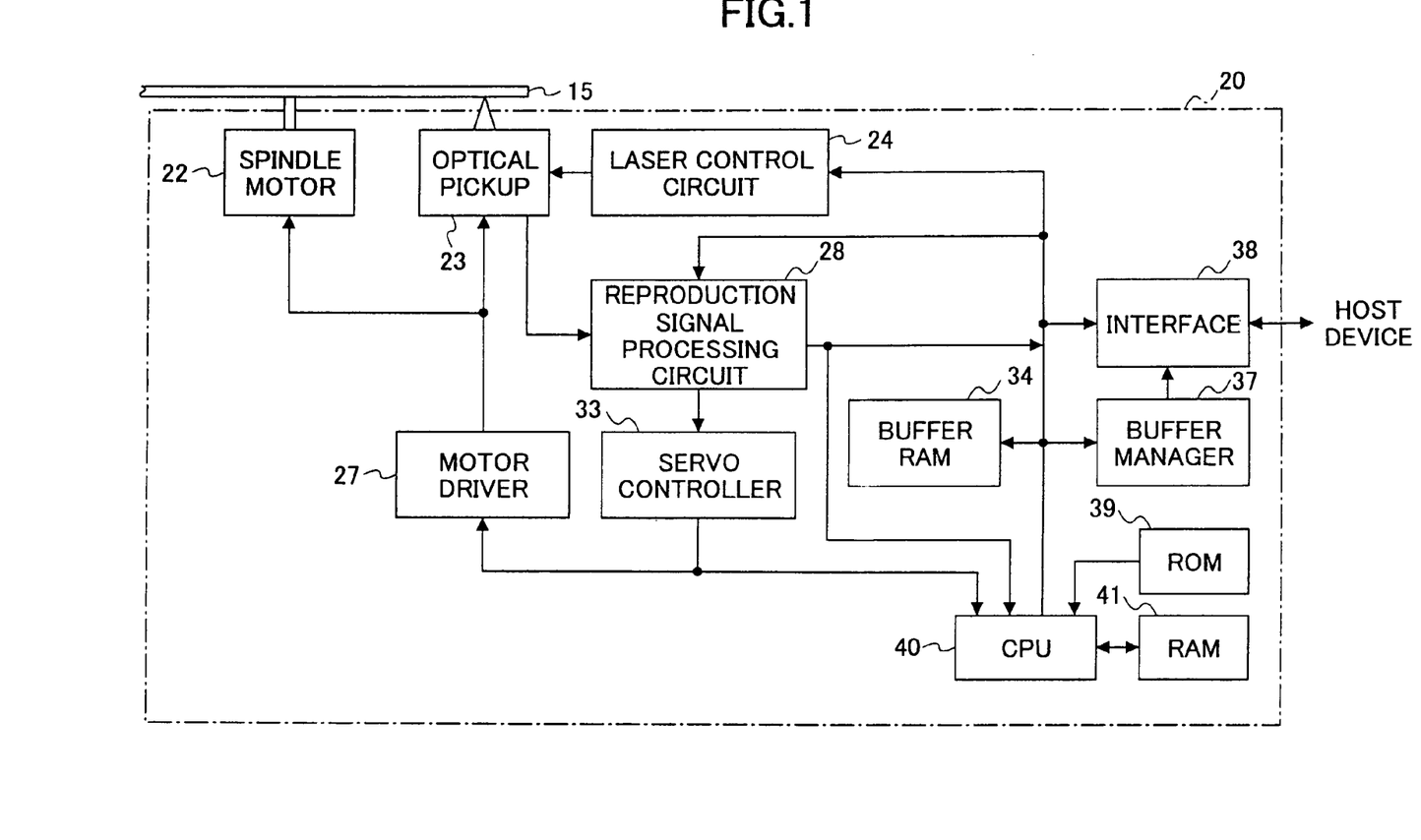
FIG. 1 is a block diagram illustrating a configuration of an optical disc device according to a first embodiment of the present invention.

FIG. 1 is a block diagram illustrating a configuration of an optical disc device 20 as an information reproducing device according to the first embodiment of the present invention.

As shown in FIG. 1, the optical disc device 20 comprises a spindle motor 22 for rotationally driving an optical disc 15 as an information recording medium, an optical pickup 23, a laser control circuit 24, a motor driver 27, a reproduction signal processing circuit 28, a servo controller 33, a buffer RAM 34, a buffer manager 37, an interface 38, a ROM 39, a CPU 40 (a control computer), a RAM 41 and so forth. It is noted that arrows shown in FIG. 1 do not show all connections between the elements, but only indicate representative courses of signals and information therebetween.

Besides, in the present embodiment, a DVD+R is used as the optical disc 15, for example.

The optical pickup 23 comprises a semiconductor laser as a light source, an optical system, a light receiver, a driving system (a focusing actuator, a tracking actuator, a seek motor, etc.) and so forth. The semiconductor laser emits a light beam. The optical system introduces the light beam to a recording surface of the optical disc 15, and introduces a return light beam reflected on the recording surface to a predetermined light receiving position. The light receiver is placed at the light receiving position so as to receive the return light beam. The light receiver supplies the reproduction signal processing circuit 28 with an electric current (an electric current signal) according to an amount of the received return light beam.

The reproduction signal processing circuit 28 converts the electric current signal output from the optical pickup 23 into a voltage signal; and according to this voltage signal, the reproduction signal processing circuit 28 detects a wobble signal, an RF signal including reproduction information, and servo signals (a focus error signal, a track error signal, etc.). The reproduction signal processing circuit 28 extracts position information and so forth from the wobble signal. This position information is supplied to the CPU 40. Further, after applying processes, such as an error correction process, to the RF signal, the reproduction signal processing circuit 28 stores the RF signal in the buffer RAM 34 via the buffer manager 37. The focus error signal and the track error signal are supplied from the reproduction signal processing circuit 28 to the servo controller 33.

According to the focus error signal, the servo controller 33 generates a control signal controlling the focusing actuator of the optical pickup 23; and according to the track error signal, the servo controller 33 generates a control signal controlling the tracking actuator of the optical pickup 23. Both of the control signals are supplied from the servo controller 33 to the motor driver 27.

The motor driver 27 drives the focusing actuator and the tracking actuator of the optical pickup 23 according to the control signals supplied from the servo controller 33. Additionally, according to an instruction from the CPU 40, the motor driver 27 controls the spindle motor 22 so that a linear velocity of the optical disc 15 becomes constant. Further, according to an instruction from the CPU 40, the motor driver 27 drives the seek motor of the optical pickup 23 so as to control a position of the optical pickup 23 in a direction of a sledge thereof, i.e., in a radial direction of the optical disc 15.

The interface 38 is a bidirectional communication interface with a host device (e.g., a personal computer), and conforms to a standard interface, such as an ATAPI (AT Attachment Packet Interface) and an SCSI (Small Computer System Interface).

The ROM 39 stores programs including a hereinafter-mentioned data management information obtaining program described in a code decodable by the CPU 40.

The CPU 40 controls operations of the heretofore-described elements according to the above-mentioned programs stored in the ROM 39, and also temporarily stores data and so forth necessary for the control in the RAM 41. Besides, upon application of power to the optical disc device 20, the above-mentioned programs stored in the ROM 39 are loaded into a main memory of the CPU 40.

Next, a description will be given, with reference to FIG. 2, of a data management information obtaining process performed in the optical disc device 20. FIG. 2 shows a flowchart corresponding to a series of processing algorithms executed by the CPU 40. The present embodiment sets forth an example where a host device makes a request for obtaining track information (the number of tracks and an address of a specified track) in a recording area of the optical disc 15. Besides, a file system of the optical disc 15 conforms to a sequential UDF (Universal Disc Format) standard.

In this example, the recording area of the optical disc 15 includes N sessions (3=<N=<191), where a session 1 is an innermost session, and a session N is an outermost session. Additionally, each of the session 1 to a session (N−1) is a close session for which a recording of data is completed, and the session N is an open session for which a recording of data is not completed. Further, in the session N, data is recorded in each of M fragments (M<16).

Also in this example, it is assumed that a session disc control block (SDCB) recorded in a lead-in (or an Intro) area of the session N is already copied to the RAM 41. This SDCB (hereinafter referred to as "SDCB of the session N") stores information which includes a session number of the session N, session information (a session number, a start address and a final address of each session) of each of the session 1 to the session (N−1), and fragment information (fragment numbers, and a start address and a final address of each fragment) in the session N.

Figure 2:
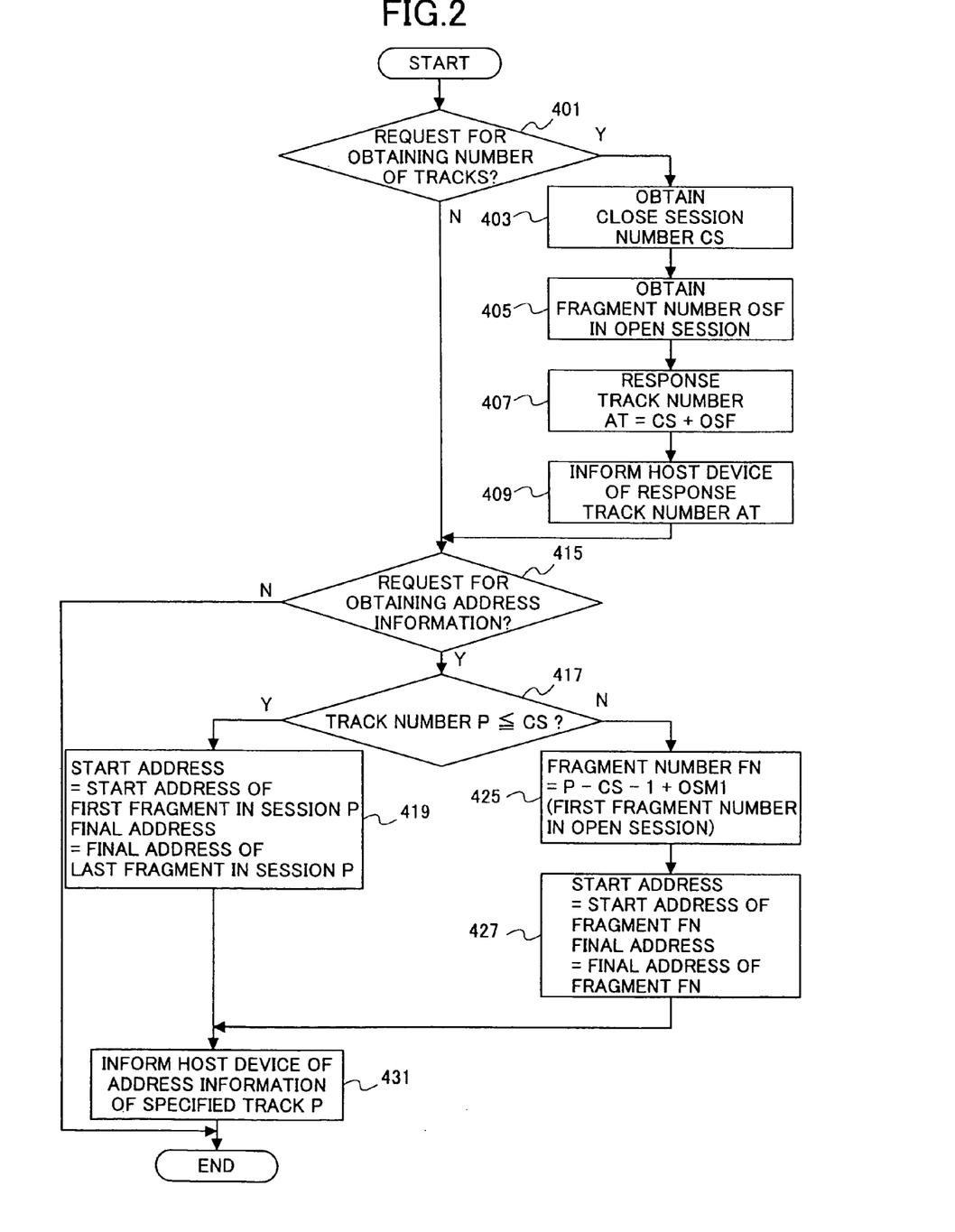
FIG. 2 is a flowchart for explaining a data management information obtaining method according to the first embodiment of the present invention.

In step 401 shown in FIG. 2, it is judged whether or not a host device makes a request for obtaining the number of tracks. In this example, since the host device makes the request for obtaining the number of tracks, the judgment in the step 401 is affirmative, and the process transits to step 403.

In the step 403, the SDCB of the session N stored in the RAM 41 is referred to, and the number of close sessions in the recording area (hereinafter referred to as "close session number CS") is obtained from the session number of the session N. More specifically, since the session numbers are allocated sequentially from the innermost session in the recording area, the session number of the session N is larger by one than the close session number CS in the recording area. That is, the close session number CS can be obtained by subtracting one from the session number of the session N.

In step 405, the SDCB of the session N stored in the RAM 41 is referred to, and the number of fragments in the open session N (hereinafter referred to as "fragment number OSF") is obtained.

In step 407, regarding each of the close sessions as a pseudo track, a response track number AT is obtained a-s a response to the request for obtaining the number of tracks, according to the following expression (1).

$$AT = CS + OSF \quad (1)$$

In step 409, the response track number AT obtained according to the foregoing expression (1) is communicated to the host device. Then, the process transits to step 415. In the present first embodiment, since the close session number CS equals (N−1), and the fragment number OSF in the open session N equals M, the response track number AT equals (N−1+M). Besides, when there is no open session, the fragment number OSF equals 0.

On the other hand, in the step 401, when the host device does not make the request for obtaining the number of tracks, the judgment in the step 401 is negative, and the process transits to the step 415.

In the step 415, it is judged whether or not the host device makes a request for obtaining an address of a specified track. In this example, since the host device makes the request for obtaining the address of the specified track, the judgment in the step 415 is affirmative, and the process transits to step 417.

In the step 417, by comparing a track number of the specified track (hereinafter referred to as "specified track number") with the close session number CS, it is judged whether or not the specified track number is equal to or smaller than the close session number CS. In other words, it is judged whether the specified track is a pseudo track or a track in the open session N. When the specified track is a pseudo track, i.e., when the specified track number is equal to or smaller than the close session number CS, the judgment in the step 417 is affirmative, and the process transits to step 419. Besides, in the present first embodiment, the specified track number is P.

In the step 419, the SDCB of the session N stored in the RAM 41 is referred to, and a start address of a session P is extracted. Then, according to the start address of the session P, an SDCB of the session P recorded in the recording area of the optical disc 15 is retrieved, and a start address of a first fragment in the session P and a final address of a last fragment in the session P are obtained. Then, the start address of the first fragment in the session P is assumed to be a start address of the specified track P, and the final address of the last fragment in the session P is assumed to be a final address of the specified track P. Thus, address information of the pseudo track is assumed to be address information of the specified track.

In the step 417, on the other hand, when the specified track is a track in the open session N, i.e., when the specified track number P exceeds the close session number CS, the judgment in the step 417 is negative, and the process transits to step 425.

In the step 425, a fragment number FN corresponding to the specified track number P is obtained according to the following expression (2).

$$FN = P - CS - 1 + OSM1 \quad (2)$$

"OSM1" in the foregoing expression (2) is a first fragment number in the open session N, which can be obtained by referring to the fragment information of the open session N recorded in the RAM 41. Besides, fragment numbers are allocated sequentially from a first fragment in the session 1. That is, fragment numbers and session numbers are irrelevant.

In step 427, the fragment information of the open session N recorded in the RAM 41 is referred to, and a start address of a fragment of the fragment number FN (hereinafter referred to as "fragment FN") is assumed to be a start address of the specified track P, and a final address of the fragment FN is assumed to be a final address of the specified track P.

In step 431, the address information of the specified track P obtained as above is communicated to the host device. Then, the data management information obtaining process is ended.

Next, a description will be given of a processing operation of the optical disc device 20 for reproducing data recorded on the optical disc 15.

When the optical disc 15 is inserted (mounted) into a predetermined position of the optical disc device 20, the CPU 40 obtains information concerning close sessions recorded on a predetermined position in the recording area of the optical disc 15. According to this information, the CPU 40 extracts an address of a last close session, and checks whether or not an open session follows the last close session. When an open session follows the last close session, the CPU 40 reads an SDCB of the open session, and copies the SDCB of the open session to the RAM 41. When no open session follows the last close session, the CPU 40 reads an SDCB of the last close session, and copies the SDCB of the last close session to the RAM 41.

Upon receiving a request from a host device for obtaining track information, the CPU 40 imparts a response to the host device, as described above with reference to FIG. 2.

Upon receiving a request from a host device for reproducing data with a specified track, the CPU 40 obtains address information of the specified track in the recording area of the optical disc 15, and reads a start address of the specified track. The CPU 40 regards this start address of the specified track as a read start position for reading data.

Then, the CPU 40 supplies the motor driver 27 with a control signal for controlling the revolution of the spindle motor 22 according to a reproducing rate, and also informs the reproduction signal processing circuit 28 of the reception of the request from the host device for reproducing data. When the revolution of the optical disc 15 reaches a predetermined linear velocity, an output signal (an electric current signal) is supplied from the optical pickup 23 to the reproduction signal processing circuit 28.

According to the output signal supplied from the optical pickup 23, the reproduction signal processing circuit 28 obtains position information, and informs the CPU 40 of this position information. Further, according to the output signal supplied from the optical pickup 23, the reproduction signal processing circuit 28 detects a focus error signal and a track error signal, and supplies the focus error signal and the track error signal to the servo controller 33. According to the focus error signal and the track error signal supplied from the reproduction signal processing circuit 28, the servo controller 33 causes the motor driver 27 to drive the focusing actuator and the tracking actuator of the optical pickup 23 and correct a focusing error and a tracking error.

According to the position information supplied from the reproduction signal processing circuit 28, the CPU 40 supplies the motor driver 27 with a signal for directing an seek operation so as to position the optical pickup 23 at the read start position.

According to the position information supplied from the reproduction signal processing circuit 28, the CPU 40 checks whether or not the optical pickup 23 is positioned at the read start position. When the CPU 40 judges that the optical pickup 23 is positioned at the read start position, the CPU 40 informs the reproduction signal processing circuit 28 of this judgment. Then, according to the output signal supplied from the optical pickup 23, the reproduction signal processing circuit 28 detects an RF signal. After applying processes, such as an error correction process, to the RF signal, the reproduction signal processing circuit 28 stores the RF signal (reproduction data) in the buffer RAM 34. Besides, until the completion of the reproducing process, the reproduction signal processing circuit 28 detects the focus error signal and the track error signal according to the output signal supplied from the optical pickup 23, as described above, and corrects a focusing error and a tracking error as needed via the servo controller 33 and the motor driver 27.

When the reproduction data stored in the buffer RAM 34 amounts to sector data, the buffer manager 37 transfers the reproduction data as the sector data to the host device via the interface 38.

As described above, in the optical disc device 20 according to the present first embodiment, the CPU 40 forms a pseudo area setting part for regarding each of close sessions as a pseudo track, a management information obtaining part for obtaining management information (including track information), and an informing part for informing a host device of the obtained management information.

Additionally, in the optical disc device 20 according to the present first embodiment, the data management information obtaining process shown in FIG. 2 performed by the CPU 40 is stored in the ROM 39 as the data management information obtaining program.

Further, in the optical disc device 20 according to the present first embodiment, the CPU 40 performs a data management information obtaining method by executing the data management information obtaining process according to the data management information obtaining program.

As described above, in the data management information obtaining method according to the present first embodiment, in response to a request from a host device for obtaining the number of tracks, the number of tracks is calculated with regarding each of the close sessions included in the recording area as a pseudo track. Therefore, the number of pseudo tracks can be immediately obtained simply by referring to the session number recorded in the SDCB of the last session (the open session N in the present first embodiment). That is, since there is no need for counting the number of all tracks (fragments) in the recording area, the requested information can be obtained quickly in response to the request for obtaining the number of tracks, compared to a conventional optical disc device.

Additionally, in the present first embodiment, the number of pseudo tracks, i.e., the number of close sessions, is obtained as a response to the request for obtaining the number of tracks. Therefore, there is no need for examining SDCBs of all of the sessions, and the number of pseudo tracks can be immediately obtained according only to the SDCB of the last session. Thus, the requested information can be obtained quickly in response to the request for obtaining the number of tracks. Besides, recording data on a recordable information recording medium necessitates information concerning tracks existing in the open session. However, information concerning tracks existing in the close sessions, on which data cannot be recorded, is not important for the data recording. Therefore, there is no inconvenience in responding the number of close sessions to the request for obtaining the number of tracks.

Further, in the present first embodiment, the sum of the number of pseudo tracks and the number of tracks in the open session N is obtained as a response to the request for obtaining the number of tracks. Conventionally, in order to count the number of tracks, SDCBs of all of the sessions need to be examined, which consumes a long time because the SDCBs of the sessions are distributed in the recording area. However, in the present first embodiment, since there is no need for counting the number of tracks in the close sessions, the requested information can be obtained quickly in response to the request for obtaining the number of tracks, compared to a conventional optical disc device.

Besides, in the present first embodiment, the start address of a first track in a close session corresponding to the track number of the specified track and the final address of a last track in the close session, i.e., the start address and the final address of the pseudo track corresponding to the track number of the specified track, are obtained as a response to a request for obtaining the address of the specified track. In this course, since the start address of the first track in the close session and the final address of the last track in the close session can be obtained in a short time, the requested information can be obtained quickly in response to the request for obtaining the address of the specified track, compared to a conventional optical disc device. Besides, recording data on a recordable information recording medium necessitates accurate address information of tracks existing in the open session. However, data is recorded sequentially, and no more data is to be recorded in the close sessions; therefore, there is substantially no practical advantage in responding accurate address information of tracks in the close sessions.

Additionally, in the present first embodiment, regarding each of the close sessions as a pseudo track reduces a maximum number of tracks to 206 {=190 (the number of pseudo tracks)+16 (the number of tracks in the open session)}. Therefore, information of each of these tracks can be retained in the RAM 41.

Further, in the optical disc device 20 according to the present first embodiment, in response to a request from a host device for obtaining track information, an area (a close session) including a plurality of tracks is regarded as a pseudo track to the extent that the requested information is not adversely influenced; accordingly, unnecessary information does not have to be obtained in response to the request from the host device. Therefore, the request from the host device for obtaining the track information can be responded in a short time.

<<Embodiment 2>>

Next, a description will be given, with reference to FIG. 3 to FIG. 6, of a second embodiment according to the present invention.

The present second embodiment has a data management information obtaining process different from the data management information obtaining process according to the foregoing first embodiment. Specifically, only the data management information obtaining program stored in the ROM 39 includes differences from the foregoing first embodiment; other than this respect, the optical disc device 20 according to the present second embodiment has the same configuration as in the foregoing first embodiment. Accordingly, the following description will be made mainly for the differences from the foregoing first embodiment, and elements that are identical or equivalent to the elements described in the foregoing first embodiment are referenced by the same reference marks, and will not be described in detail.

Thus, the description will be given, with reference to FIG. 3 to FIG. 6, of the data management information obtaining process performed in the optical disc device 20 comprising the ROM 39 storing the data management information obtaining program according to the present second embodiment. FIG. 3 to FIG. 6 show flowcharts corresponding to a series of processing algorithms executed by the CPU 40. The present second embodiment sets forth an example where a host device makes a request for obtaining session information (the number of sessions) and track information (the number of tracks and an address of a specified track) in the recording area of the optical disc 15. Besides, the optical disc 15 meets the same preconditions as in the foregoing first embodiment.

Figure 3:
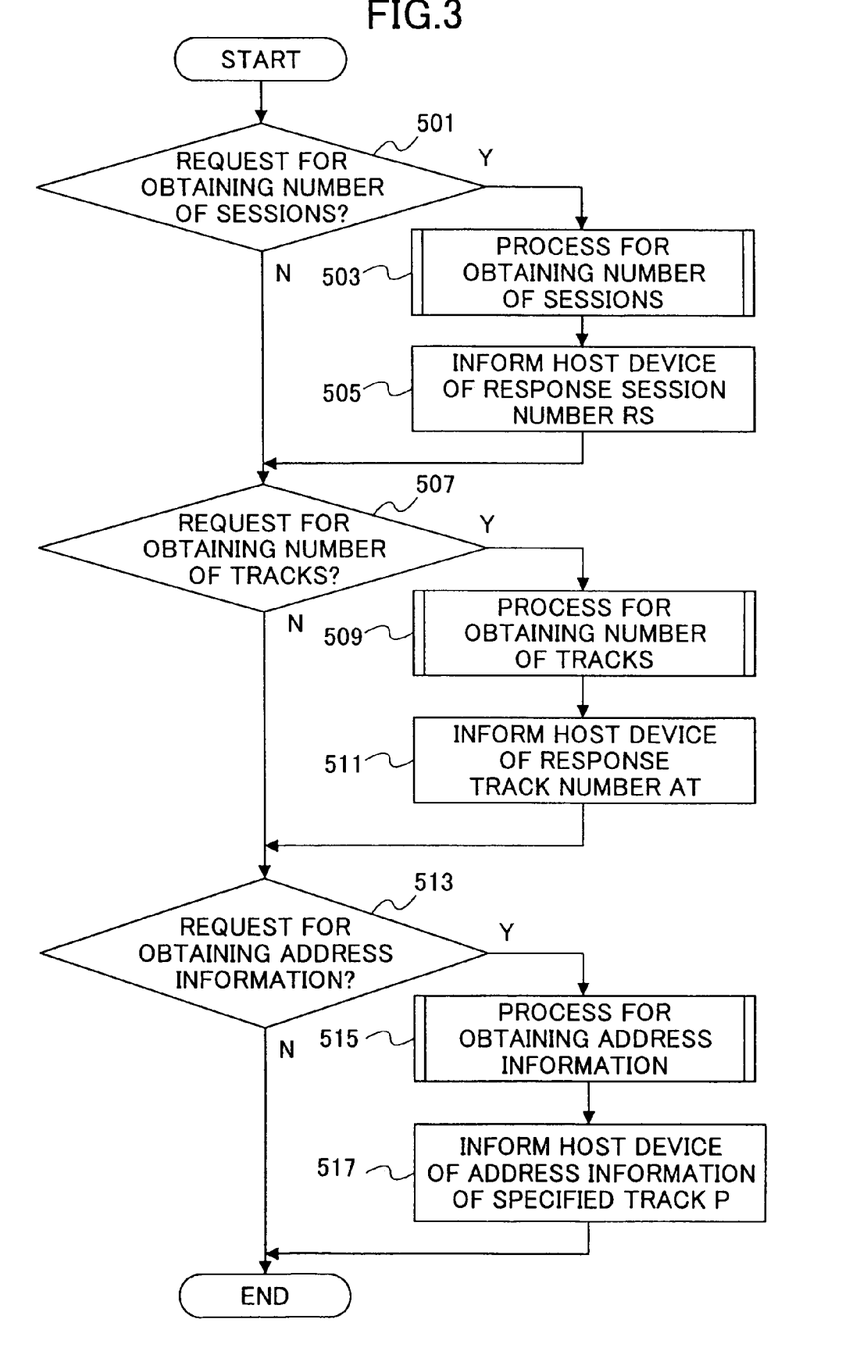
FIG. 3 is a flowchart for explaining a data management information obtaining method according to a second embodiment of the present invention.

In step 501 shown in FIG. 3, it is judged whether or not a host device makes a request for obtaining the number of sessions in the recording area of the optical disc 15. In this example, since the host device makes the request for obtaining the number of sessions, the judgment in the step 501 is affirmative, and the process transits to step 503.

In the step 503, a process for obtaining the number of sessions is performed. Here, a description will be given, with reference to FIG. 4, of the process for obtaining the number of sessions.

Figure 4:
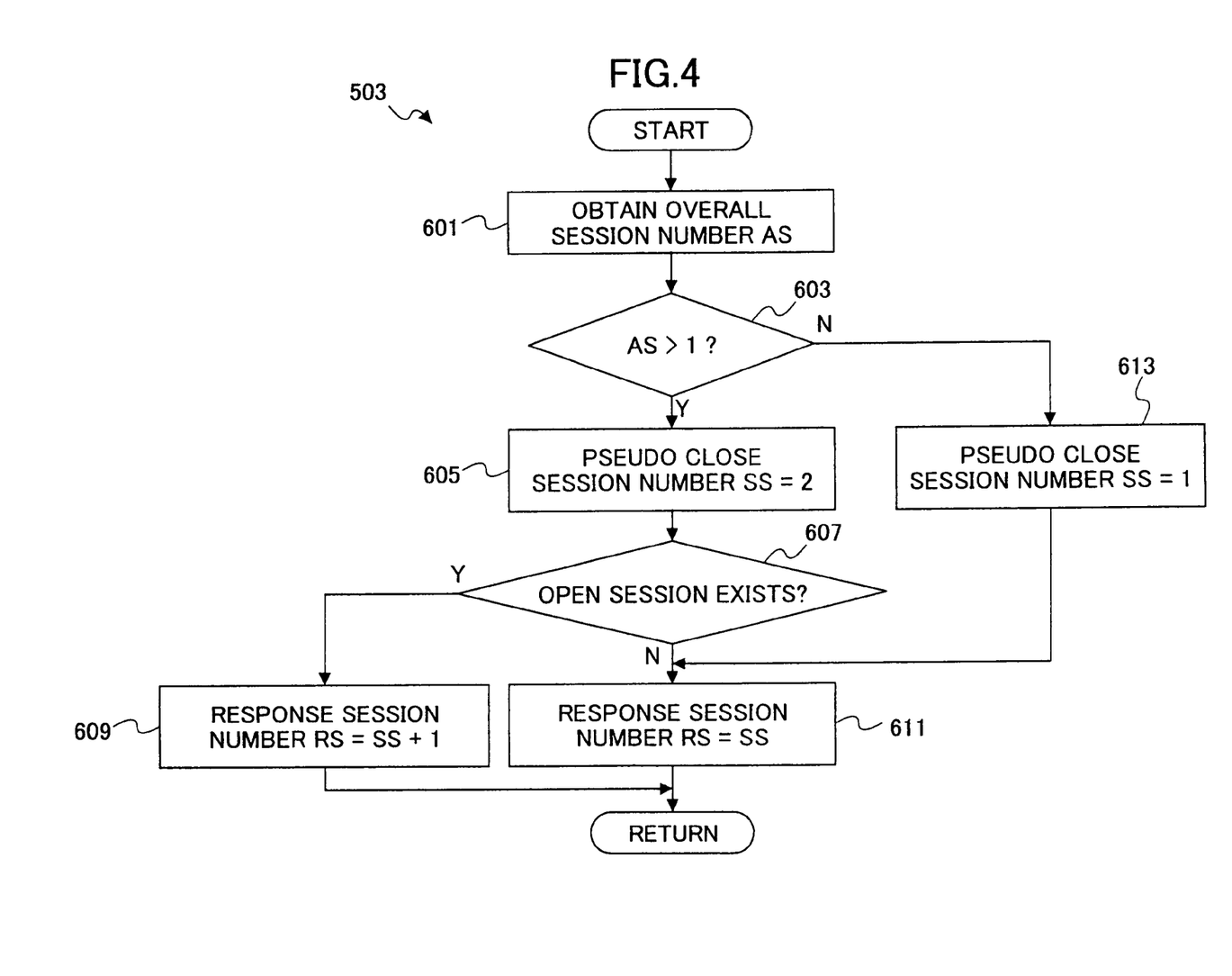
FIG. 4 is a flowchart for explaining a process for obtaining the number of sessions performed in the data management information obtaining method shown in FIG. 3.

In step 601 shown in FIG. 4, the SDCB of the session N recorded in the RAM 41 is referred to, and the number of all of sessions in the recording area (hereinafter referred to as "overall session number AS") is obtained. More specifically, the session number of the session N recorded in the RAM 41 is obtained as the overall session number AS.

In step 603, it is judged whether or not the overall session number AS exceeds "1". In this example, since the overall session number AS exceeds "1", the judgment in the step 603 is affirmative, and the process transits to step 605.

In the step 605, (N−2) sessions from the session 1 to the session (N−2) are regarded as one pseudo session. Then, since the recording area includes a total of two close sessions, i.e., the above-mentioned pseudo session and the session (N−1), the number of pseudo close sessions (hereinafter referred to as "pseudo close session number SS") is set to "2".

In step 607, it is judged whether or not an open session exists in the recording area. Specifically, by referring to the SDCB of the session N recorded in the RAM 41, and checking whether the session N is an open session or a close session, it can be judged whether or not an open session exists in the recording area. In this example, since an open session exists in the recording area, the judgment in the step 607 is affirmative, and the process transits to step 609.

In the step 609, the number of response sessions (hereinafter referred to as "response session number RS") is calculated as a response to the request from the host device for obtaining the number of sessions, according to the following expression (3). Specifically, the response session number RS becomes a value (=3) obtained by adding the number of the open session (=1) to the pseudo close session number SS. Then, the process for obtaining the number of sessions is ended.

$$RS=SS+1 \qquad (3)$$

On the other hand, in the step 607, when an open session does not exist in the recording area, i.e., when the session N is not an open session, the judgment in the step 607 is negative, and the process transits to step 611.

In the step 611, the response session number RS is calculated according to the following expression (4). Specifically, the response session number RS becomes a value identical to the pseudo close session number SS. Then, the process for obtaining the number of sessions is ended.

$$RS=SS \qquad (4)$$

On the other hand, in step 603, when the overall session number AS is "1", i.e, when only one session exists in the recording area, the judgment in the step 603 is negative, and the process transits to step 613.

In the step 613, since only one session exists in the recording area, the pseudo close session number SS is set to "1". Then, the process transits to step 611.

In step 505 shown in FIG. 3, the response session number RS obtained by the process for obtaining the number of sessions is communicated to the host device. Then, the process transits to step 507.

On the other hand, in the step 501, when the host device does not make the request for obtaining the number of sessions, the judgment in the step 501 is negative, and the process transits to the step 507.

In the step 507, it is judged whether or not the host device makes a request for obtaining the number of tracks in the recording area. In this example, since the host device makes the request for obtaining the number of tracks, the judgment in the step 507 is affirmative, and the process transits to step 509.

In the step 509, a process for obtaining the number of tracks is performed. Here, a description will be given, with reference to FIG. 5, of the process for obtaining the number of tracks.

Figure 5:
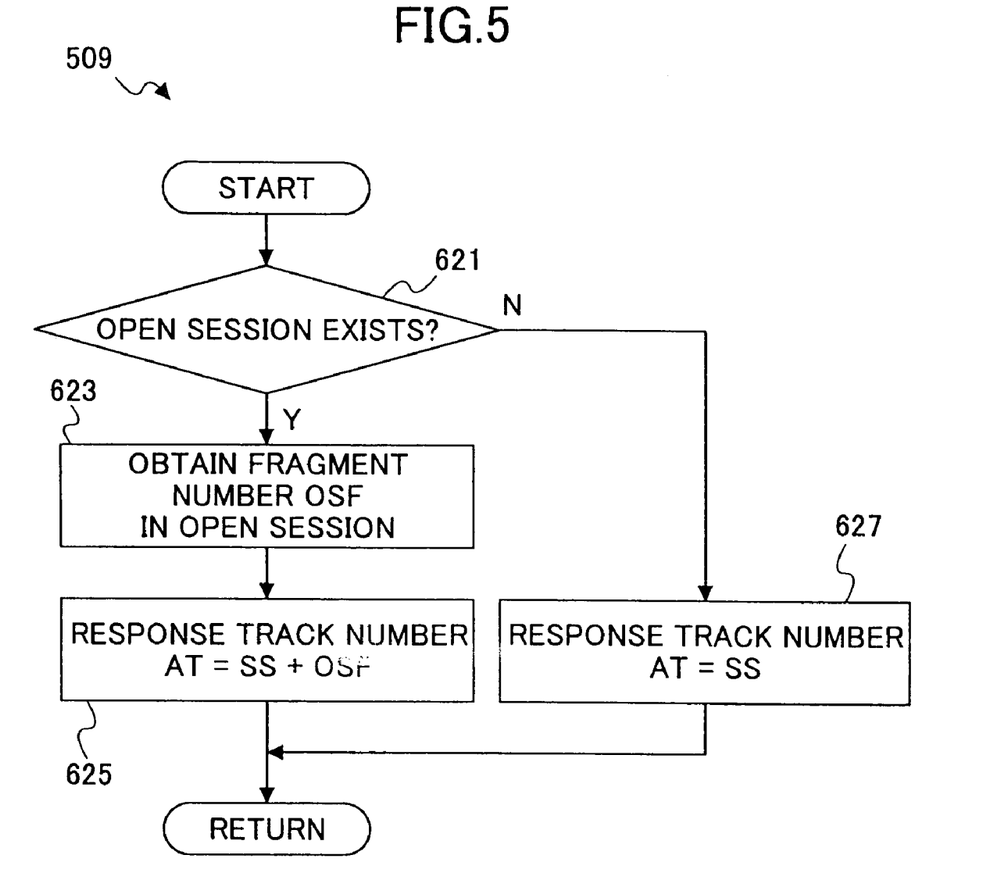
FIG. 5 is a flowchart for explaining a process for obtaining the number of tracks performed in the data management information obtaining method shown in FIG. 3.

In step 621 shown in FIG. 5, it is judged whether or not an open session exists in the recording area. In this example, since an open session exists in the recording area, the judgment in the step 621 is affirmative, and the process transits to step 623.

In the step 623, the fragment information of the session N recorded in the RAM 41 is referred to, and the number of fragments in the open session N ("fragment number OSF") is obtained.

In step 625, the number of response tracks ("response track number AT") is obtained as a response to the request from the host device for obtaining the number of tracks, according to the following expression (5). Specifically, regarding the pseudo (close) session and the last close session as pseudo tracks, the response track number AT is calculated.

$$AT=SS+OSF \quad (5)$$

In the present second embodiment, since the pseudo close session number SS equals "2", and the fragment number OSF in the open session N equals M, the response track number AT equals (M+2). Then, the process for obtaining the number of tracks is ended.

On the other hand, in the step 621, when an open session does not exist in the recording area, the judgment in the step 621 is negative, and the process transits to step 627.

In the step 627, the response track number AT is calculated according to the following expression (6). Specifically, the response track number AT becomes a value identical to the pseudo close session number SS. Then, the process for obtaining the number of tracks is ended.

$$AT=SS \quad (6)$$

In step 511 shown in FIG. 3, the response track number AT obtained by the process for obtaining the number of tracks is communicated to the host device. Then, the process transits to step 513.

On the other hand, in the step 507, when the host device does not make the request for obtaining the number of tracks, the judgment in the step 507 is negative, and the process transits to the step 513.

In the step 513, it is judged whether or not the host device makes a request for obtaining address information of a specified track. In this example, since the host device makes the request for obtaining the address information of the specified track, the judgment in the step 513 is affirmative, and the process transits to step 515. Besides, the host device specifies the above-mentioned specified track by a track number ("specified track number"), as in the foregoing first embodiment.

In the step 515, a process for obtaining the address information is performed. Here, a description will be given, with reference to FIG. 6, of the process for obtaining the address information.

Figure 6:
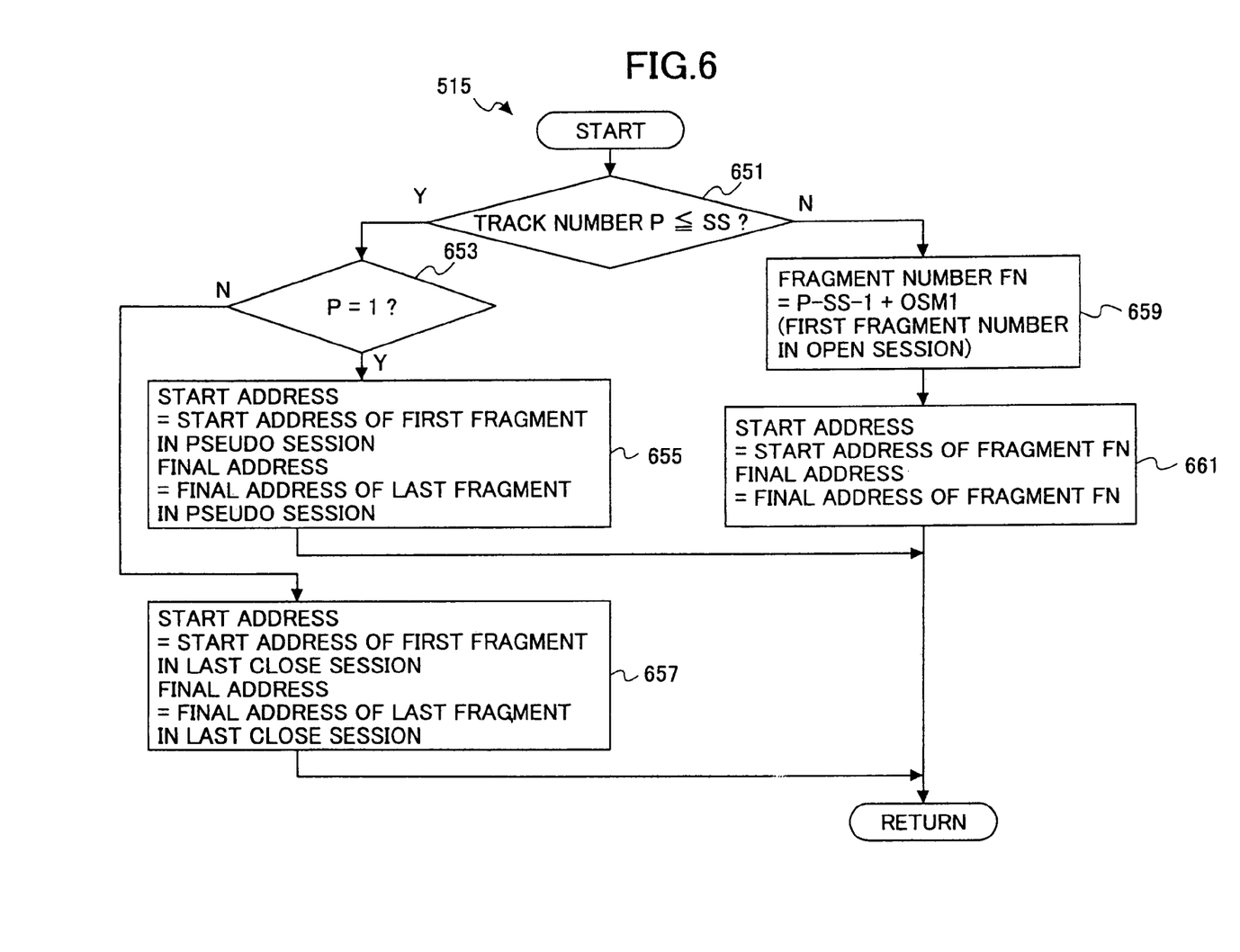
FIG. 6 is a flowchart for explaining a process for obtaining address information performed in the data management information obtaining method shown in FIG. 3.

In step 651 shown in FIG. 6, by comparing the specified track number with the pseudo close session number SS, it is judged whether or not the specified track number is equal to or smaller than the pseudo close session number SS. In other words, it is judged whether the specified track is a pseudo track (the pseudo session or the last close session) or a track in the open session N. When the specified track is a pseudo track, i.e., when the specified track number is equal to or smaller than the pseudo close session number SS, the judgment in the step 651 is affirmative, and the process transits to step 653. Besides, in the present second embodiment, the specified track number is P, as an example.

In the step 653, it is judged whether or not the specified track number P is "1". In other words, it is judged whether the specified track is the pseudo session or the last close session. When the specified track is the pseudo session, i.e., when the specified track number P is "1", the judgment in the step 653 is affirmative, and the process transits to step 655.

In the step 655, the SDCB of the session N stored in the RAM 41 is referred to, and a start address of the session 1 and a final address of the session (N−2) are obtained. Then, the start address of the session 1 is assumed to be a start address of the specified track P, and the final address of the session (N−2) is assumed to be a final address of the specified track P. Then, the process for obtaining the address information is ended.

On the other hand, in the step 653, when the specified track is the last close session, i.e., when the specified track number P is "2", the judgment in the step 653 is negative, and the process transits to step 657.

In the step 657, the SDCB of the session N stored in the RAM 41 is referred to, and a start address of a first fragment in the session (N−1), i.e., the last close session, and a final address of a last fragment in the session (N−1) are obtained. Then, the start address of the first fragment in the session (N−1) is assumed to be a start address of the specified track P, and the final address of the last fragment in the session (N−1) is assumed to be a final address of the specified track P. Then, the process for obtaining the address information is ended.

On the other hand, in the step 651, when the specified track is a track in the open session N, i.e., when the specified track number P exceeds the pseudo close session number SS, the judgment in the step 651 is negative, and the process transits to step 659.

In the step 659, a fragment number FN corresponding to the specified track number P is obtained according to the following expression (7).

$$FN=P-SS-1+OSM1 \quad (7)$$

In step 661, a start address of a fragment of the fragment number FN ("fragment FN") is assumed to be a start address of the specified track P, and a final address of the fragment FN is assumed to be a final address of the specified track P. Then, the process for obtaining the address information is ended.

In step 517 shown in FIG. 3, the start address and the final address of the specified track P obtained by the process for obtaining the address information is communicated to the host device. Then, the data management information obtaining process is ended.

In the optical disc device 20 according to the present second embodiment, data recorded on the optical disc 15 is reproduced according to a request from a host device for reproducing data with a specified track, as in the foregoing first embodiment.

As described above, in the optical disc device 20 according to the present second embodiment, the data management information obtaining process including the processes shown in FIG. 3 to FIG. 6 performed by the CPU 40 is stored in the ROM 39 as the data management information obtaining program.

Additionally, in the optical disc device 20 according to the present second embodiment, the CPU 40 performs a data management information obtaining method by executing the data management information obtaining process according to the above-mentioned data management information obtaining program.

As described above, in the data management information obtaining method according to the present second embodiment, in response to a request from a host device for obtaining the number of sessions, close sessions except at least the last close session among the close sessions included in the recording area are regarded as one session. Latest file information of recorded data is recorded at a predetermined position in the last close session; therefore, even when the close sessions except the last close session are regarded as one pseudo session, the above-mentioned latest file information recorded in the last close session can be read accurately. Especially, on a recordable information recording medium, data is recorded sequentially; therefore, regarding the close sessions except the last close session as one pseudo session causes no inconvenience in responding to the request for obtaining the number of sessions.

Additionally, in the present second embodiment, when the recording area of the optical disc 15 includes a plurality of close sessions and an open session, the number of sessions is responded as "3" to the request for obtaining the number of sessions; and when the recording area of the optical disc 15 includes only a plurality of close sessions, the number of sessions is responded as "2" to the request for obtaining the number of sessions. That is, a value obtained by adding "1" to the number of sessions excluded from the pseudo session among the sessions included in the recording area of the optical disc 15 is obtained as a response to the request for obtaining the number of sessions. Thus, there is no need for counting the number of sessions in the recording area; this simplifies the process for obtaining the number of sessions, compared to a conventional optical disc device. Accordingly, the requested information can be obtained quickly in response to the request for obtaining the number of sessions.

Additionally, in the present second embodiment, all tracks included in the close sessions except the last close session are regarded as one pseudo track in obtaining a response to a request for obtaining the number of tracks. Accordingly, the number of tracks in the pseudo track does not have to be counted; this simplifies the process for obtaining the number of tracks, compared to a conventional optical disc device. Accordingly, the requested information can be obtained quickly in response to the request for obtaining the number of tracks.

Additionally, in the present second embodiment, when the recording area of the optical disc 15 includes only a plurality of close sessions, the number of tracks is responded as "2" to the request for obtaining the number of tracks; and when the recording area of the optical disc 15 includes a plurality of close sessions and an open session, the number of tracks is responded as the number of tracks in the open session plus "2" to the request for obtaining the number of tracks. This simplifies the process for obtaining the number of tracks. Accordingly, the requested information can be obtained quickly in response to the request for obtaining the number of tracks, compared to a conventional optical disc device.

Besides, an Intro and a Closure of each session include a sector ID thereof as a user data attribute; further, a logical address is allocated thereto. Accordingly, regarding a plurality of close sessions as one close session causes no inconvenience for a normal reproduction of data.

Besides, in the present second embodiment, in response to a request for obtaining address information of a specified track, all tracks included in the close sessions except the last close session are regarded as one pseudo track, and the start address of a first track in the pseudo track and the final address of a last track in the pseudo track are obtained as the response to the request for obtaining the address information of the specified track. Consequently, the requested information can be obtained quickly in response to the request for obtaining the address information, compared to a conventional optical disc device. Besides, even when the tracks included in the close sessions except the last close session are regarded as one pseudo track, the Intro and the Closure of each session can be recognized accurately; therefore, the response obtained as above exerts no adverse effect upon reproduction of data.

As described above, regarding the close sessions except at least the last close session as one session or one track can simplify the processes concerning sessions and tracks. For example, when the close sessions except the last close session are regarded as one pseudo session, the number of sessions for the host device becomes "3" {(the pseudo session)+(the last close session)+(the open session)} at the maximum. Additionally, for example, when the close sessions except the last close session are regarded as one pseudo track, and also when the last close session is regarded as one pseudo track, the number of tracks for the host device becomes "18" {(the number of pseudo tracks=2)+(the number of tracks in the open session=16)} at the maximum.

Further, in the optical disc device 20 according to the present second embodiment, in response to a request from a host device for obtaining data management information, an area (close sessions) including a plurality of tracks is regarded as a pseudo track to the extent that the requested information is not adversely influenced; accordingly, unnecessary information does not have to be obtained in response to the request from the host device. Therefore, the request from the host device for obtaining the session information and the track information can be responded in a short time.

Besides, in the present second embodiment, the close sessions except only the last close session among the close sessions included in the recording area are regarded as a pseudo session; however, the present invention is not limited thereto. For example, close sessions except other close sessions including the last close session may be regarded as a pseudo session.

Further, in the present second embodiment, the last close session is distinguished from the close sessions except the last close session in setting one pseudo session or one pseudo track; however, when the recording area of the optical disc 15 includes an open session, and the optical disc device 20 can reproduce data recorded in the open session, the last close session does not necessarily have to be distinguished from the close sessions except the last close session.

Additionally, in the present second embodiment, the recording area includes at least one close session; however, the recording area may include only the open session. In this case, neither the pseudo session nor the pseudo track is set. Additionally, in the step 625 shown in FIG. 5, the CPU 40 calculates the response track number AT according to the following expression (8) in place of the foregoing expression (5).

$$AT = OSF \qquad (8)$$

Further, in the above-mentioned case, the CPU 40 performs the process for obtaining the address information shown in FIG. 6, with the pseudo close session number SS being zero.

Additionally, in the foregoing embodiments, the CPU 40 reads an SDCB of the open session or the last close session, and copies the SDCB to the RAM 41, when the optical disc 15 is inserted into a predetermined position of the optical disc device 20; however, the CPU 40 may read the SDCB upon receiving a request from a host device for obtaining data management information.

Besides, in the optical disc device 20 according to the foregoing embodiments, the data management information obtaining program is stored in the ROM 39; however, the data management information obtaining program may be stored in other information recording media (a CD-ROM, a magneto-optical disc, an MO, etc.), as long as the data management information obtaining program can be loaded into the main memory of the CPU 40.

Additionally, in the foregoing embodiments, a DVD+R is used as the optical disc 15; however, the optical disc 15 may be replaced by other information recording media on which data is recorded on a plurality of divided data areas, such as sessions or tracks, in a recording area thereof.

Further, the optical disc device 20 according to the foregoing embodiments may be provided in a same body incorporating the host device, or may be provided in a different body not incorporating the host device.

Additionally, in the foregoing embodiments, the optical disc device is used as the information reproducing device; however, other information reproducing devices may be used as long as the information reproducing devices can reproduce data from information recording media on which data is recorded on a plurality of divided data areas, such as sessions or tracks, in a recording area thereof. Further, these information recording/reproducing devices may not only reproduce but also record data.

The present invention is not limited to the specifically disclosed embodiments, and variations and modifications may be made without departing from the scope of the present invention.

The present application is based on Japanese priority applications No. 2001-385652 filed on Dec. 19, 2001, and No. 2001-393643 filed on Dec. 26, 2001 the entire contents of which are hereby incorporated by reference.

What is claimed is:

1. A data management information obtaining method for obtaining data management information concerning a recording of data recorded on each of a plurality of data areas divided in a recording area of an information recording medium as a response to a request for obtaining the data management information, the method comprising:

the step of obtaining said data management information including information concerning a plurality of predetermined data areas among said data areas as information concerning a predetermined pseudo area which comprises at least one of said data areas in response to said request for obtaining said data management information.

2. The data management information obtaining method as claimed in claim 1, wherein said recording area includes at least one session including tracks as said data areas, and said data management information includes at least one of a number of the sessions included in said recording area, a number of the tracks included in said recording area, and a track address indicating a recording position of each of the tracks specified by a track number.

3. The data management information obtaining method as claimed in claim 1, wherein said information recording medium is an information recording medium conforming to a standard of a DVD+R.

* * * * *